United States Patent
Tanabe

(10) Patent No.: US 12,321,041 B2
(45) Date of Patent: Jun. 3, 2025

(54) OBJECTIVE LENS

(71) Applicant: KYOCERA SOC Corporation, Kanagawa (JP)

(72) Inventor: Takao Tanabe, Kanagawa (JP)

(73) Assignee: KYOCERA SOC Corporation, Yokohama (JP)

(*) Notice: Subject to any disclaimer, the term of this patent is extended or adjusted under 35 U.S.C. 154(b) by 423 days.

(21) Appl. No.: 17/969,225

(22) Filed: Oct. 19, 2022

(65) Prior Publication Data
US 2023/0288670 A1   Sep. 14, 2023

(30) Foreign Application Priority Data
Mar. 8, 2022 (JP) .................... 2022-035127

(51) Int. Cl.
*G02B 9/64* (2006.01)
*G02B 1/02* (2006.01)

(52) U.S. Cl.
CPC .......... *G02B 9/64* (2013.01); *G02B 1/02* (2013.01)

(58) Field of Classification Search
CPC .......... G02B 1/02; G02B 9/64; G02B 13/00; G02B 13/18
See application file for complete search history.

(56) References Cited

U.S. PATENT DOCUMENTS

| | | | |
|---|---|---|---|
| 5,440,422 | A | 8/1995 | Vollrath |
| 6,952,256 | B2 | 10/2005 | Roncone et al. |
| 2004/0070846 | A1 | 4/2004 | Dobschal et al. |
| 2006/0087725 | A1 | 4/2006 | Arriola |

FOREIGN PATENT DOCUMENTS

| | | |
|---|---|---|
| JP | H06-242381 A | 9/1994 |
| JP | H11-30754 A | 2/1999 |
| JP | 2000-155267 A | 6/2000 |
| JP | 2002-182116 A | 6/2002 |
| JP | 2004-118072 A | 4/2004 |
| JP | 2004-212920 A | 7/2004 |
| JP | 2010-55006 A | 3/2010 |

OTHER PUBLICATIONS

Webb et al., "Optical Design Forms for DUV&VUV Microlithographic Processes," Optical Microlithography XIV, Proceedings of SPIE vol. 4346 (2001)—pp. 566-576.

*Primary Examiner* — Jack Dinh
(74) *Attorney, Agent, or Firm* — Dority & Manning, P.A.

(57) ABSTRACT

An objective lens includes first to ninth lenses arranged in this order from a magnification side and includes no cemented lens. The first lens consists of a meniscus lens having a negative refractive power, the second lens consists of a biconcave lens, the third lens consists of a meniscus lens having a positive refractive power, the fourth lens consists of a biconvex lens, the fifth lens consists of a meniscus lens having a negative refractive power, the sixth lens consists of a biconvex lens, the seventh lens consists of a lens that has an arbitrary shape and has a positive refractive power, the eighth lens consists of a meniscus lens having a positive refractive power; and the ninth lens consists of a meniscus lens having a positive refractive power. The ninth lens has a thickness 1.5 times to 3 times a focal length of the objective lens.

4 Claims, 16 Drawing Sheets

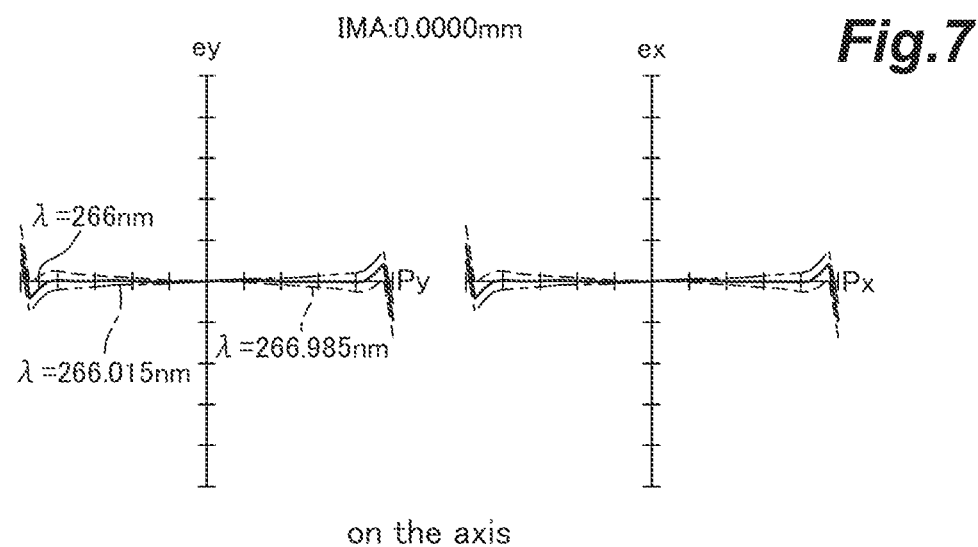
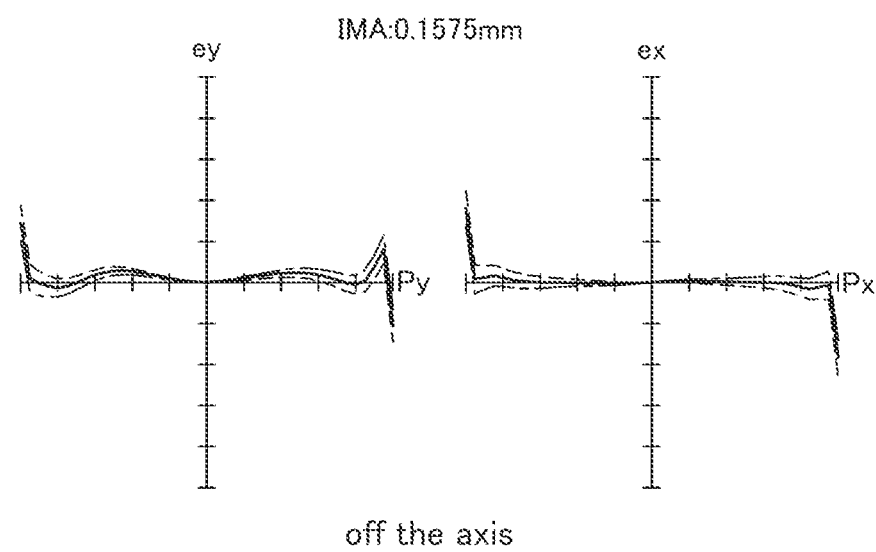
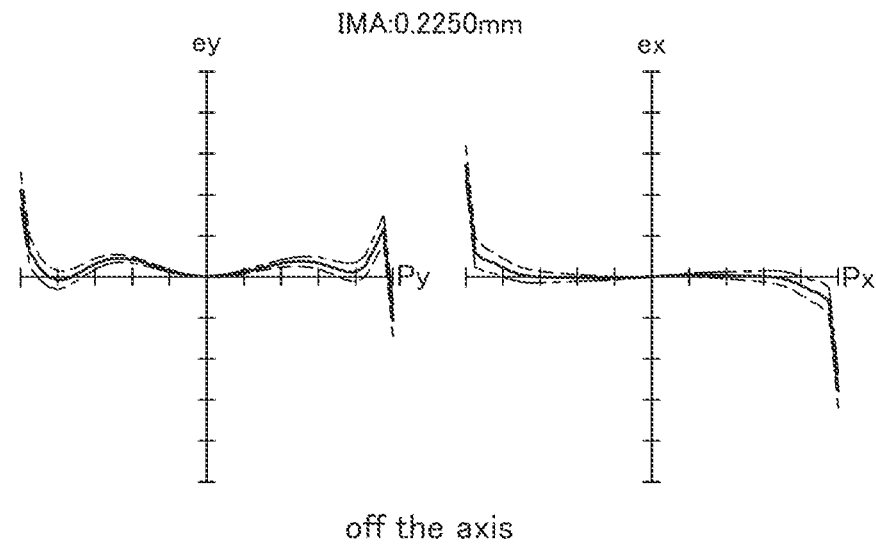
Fig.7

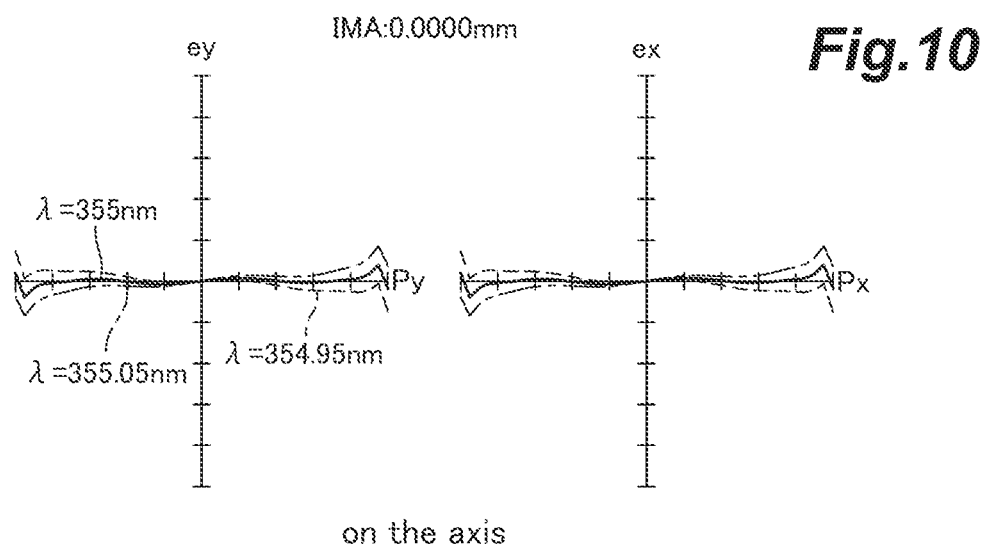
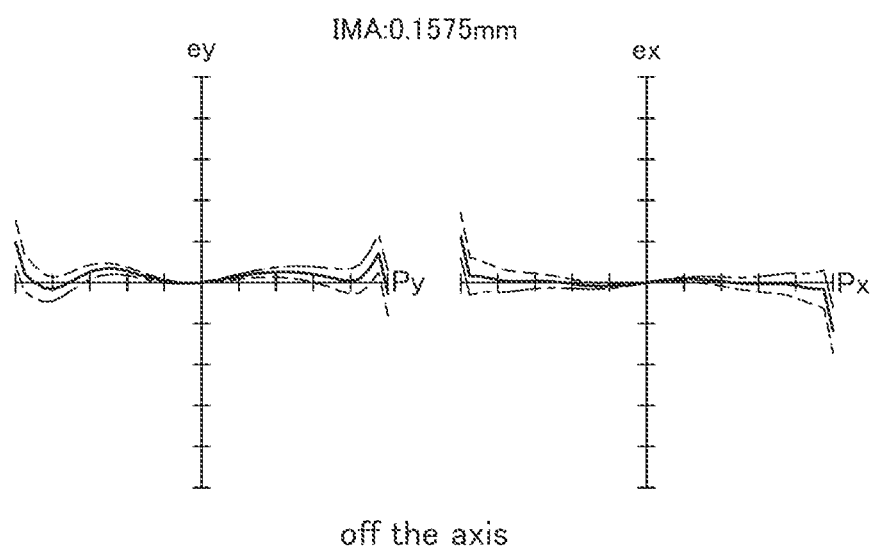
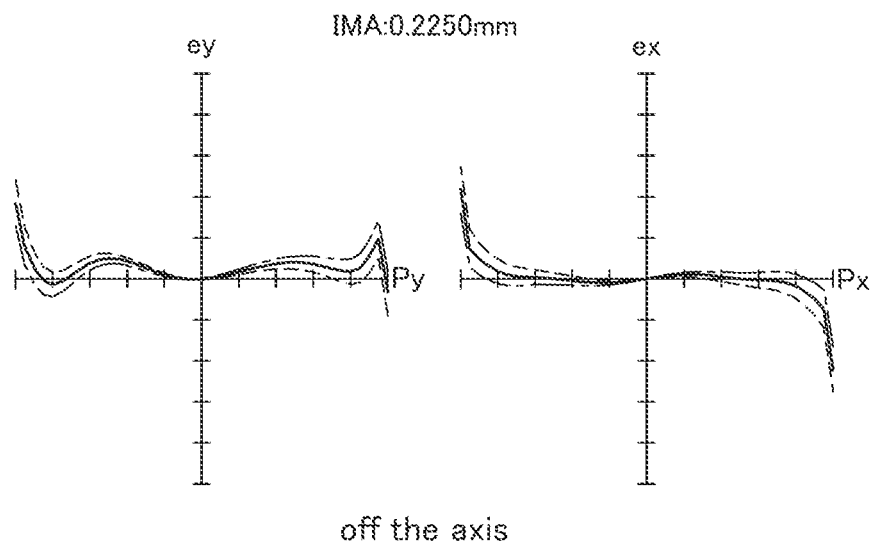
Fig.10

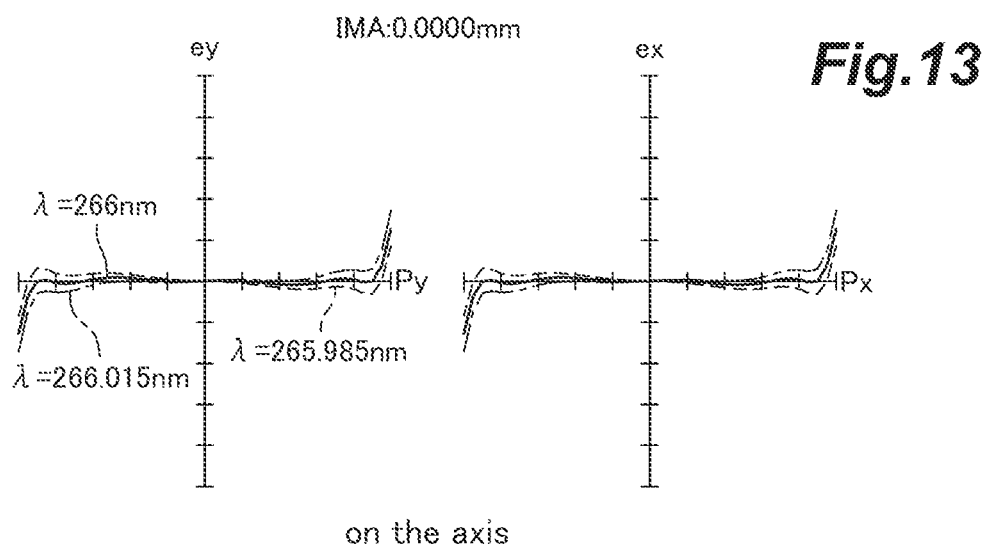
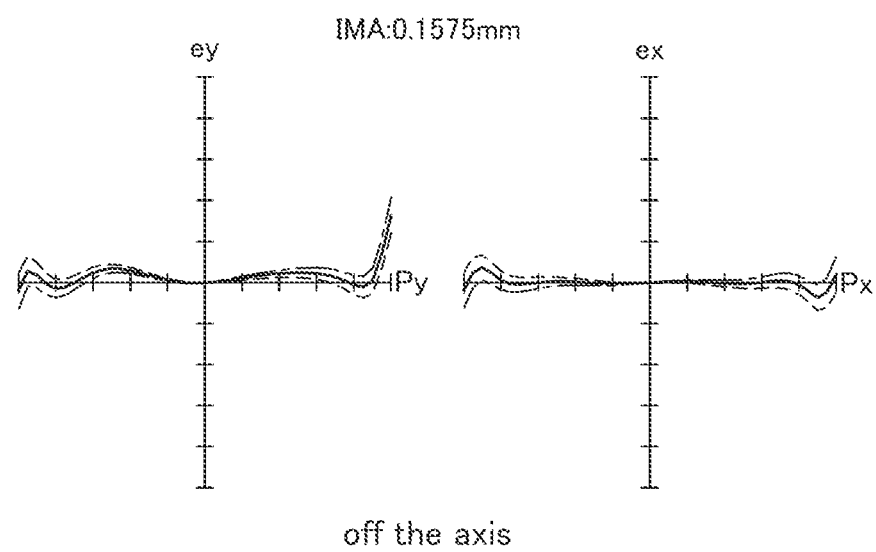
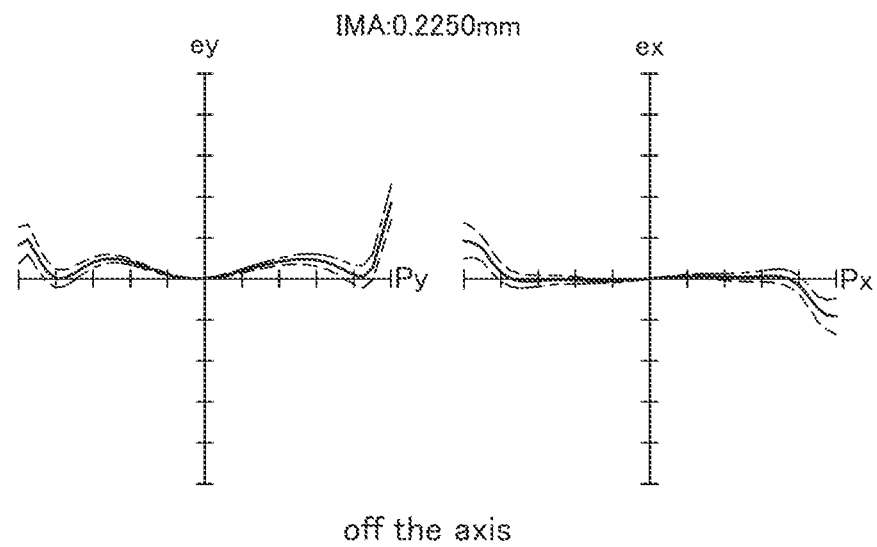
Fig.13

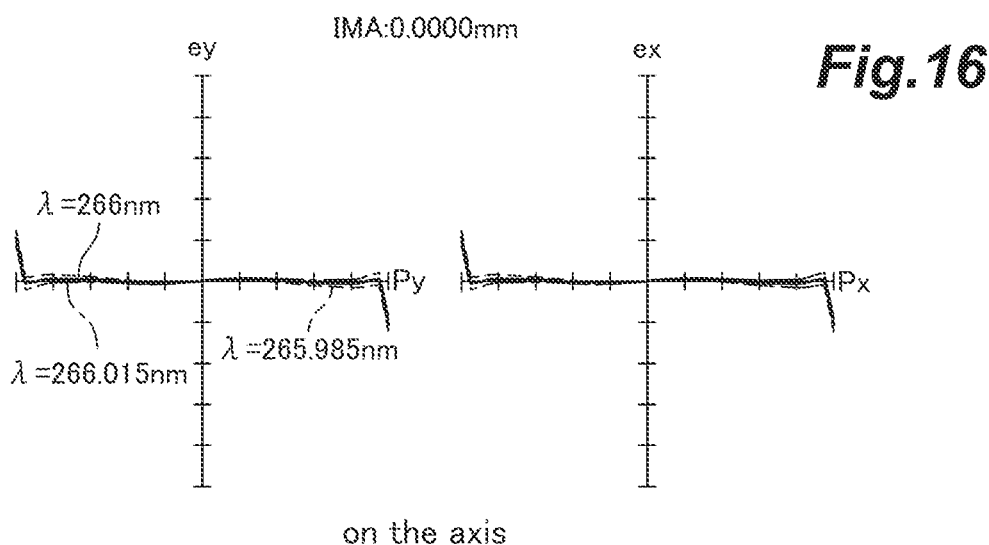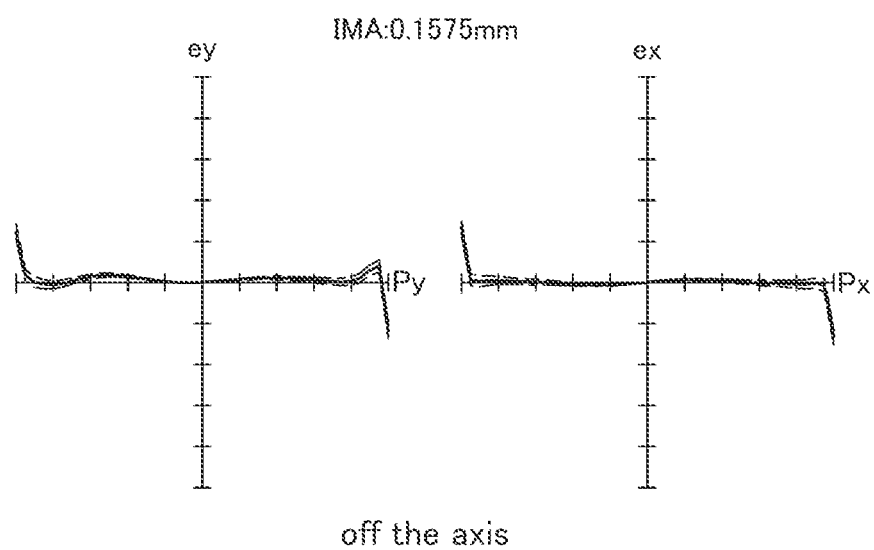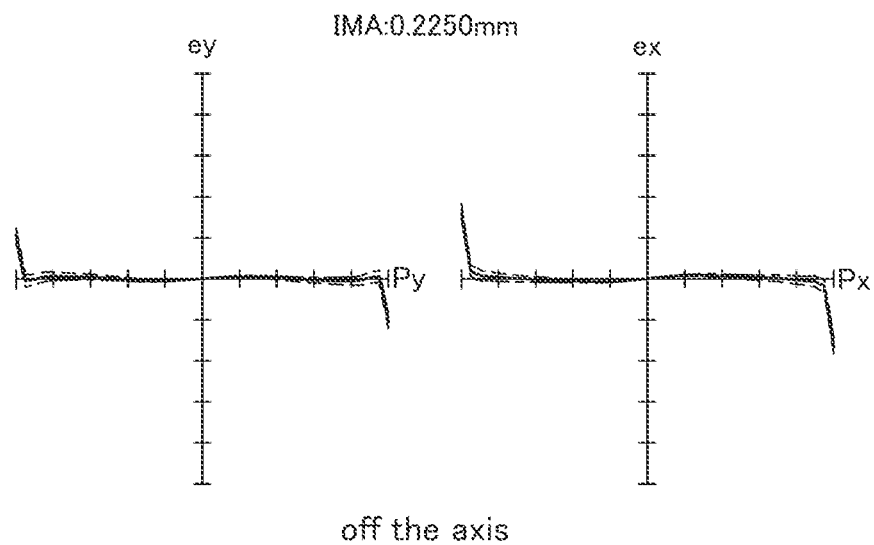
Fig.16

OBJECTIVE LENS

TECHNICAL FIELD

The present invention relates to an objective lens, and particularly relates to a small objective lens suitable for use in collecting light emitted from a laser light source, observation under illumination by a laser light source, and the like.

BACKGROUND ART

Objective lenses whose aberration is corrected for various laser radiation wavelengths are widely used in imaging applications for laser processing devices and inspection tools. The wavelengths of the lasers may be, for example, a harmonic of a YAG laser, such as 266 nm, 355 nm, or 532 nm, a wavelength of an excimer laser, such as 193.4 nm or 248 nm, a solid laser wavelength approximate to any of these, or 405 nm of a laser diode light source.

In the objective lenses of this kind, it is desirable that the numerical aperture (NA) is large and the field of view is wide while the lens is small in size and low in cost. In the following, these will be described in detail.

First, the NA preferably is 0.75 or larger. This is because the spot diameter of the lens is determined by the NA and the larger the NA is, the higher resolution can be achieved.

Second, the field angle of view is preferably as large as microscope objectives for general use, particularly for industrial or biomedical purposes. Here, provided that D denotes the diameter of full field, f the focal length, then the half-angle of field of view ω is determined by the following formula, $$\omega = \arctan(D/2/f)$$

Alternatively, by using the image height y, it can be determined as follows.

$$\omega = \arctan(y/f)$$

For example, consider a 50× objective lens with a field number of 20, which is a typical field number. In this case, if the focal length f of the imaging lens is 200 mm, the focal length f of the objective lens is 4 mm. Since the field number is a field-of-view diameter of the image plane of the imaging lens expressed by the unit of mm, the sample surface diameter D of the objective lens becomes 20 mm/50=0.4 mm. Hence, the half-angle of field of view ω of the objective lens becomes arctan (0.4 mm/2/4 mm)=2.86 degrees.

It is preferred that objective lenses mentioned above also should have sizes similar to those of commercially available microscope objectives. Specifically, it is desired that the overall length is 100 mm or less and the diameter including the barrel is 40 mm or less. One reason is that inexpensive, commercially available piezo stages can be used as a lens driving device.

And finally. Regarding the cost, it is preferred that objective lenses of this kind also should not include aspheric surfaces and diffractive optical elements (DOEs). Namely, it is preferred that each of the elements constituting the objective lens consists of an ordinary spherical lens. This is because aspheric surfaces and special optical elements such as DOEs can be significant cost-increasing factors and can be additional error factors that are not present with spherical lenses.

Also, it is, of course, preferred that the number of lenses is as small as possible while chromatic aberrations are corrected within the wavelength range of the laser. This is because reducing the number of lenses can not only meet cost requirements but also suppress adverse effects of flares and ghosts generated by the reflection on the lens surfaces.

Therefore, even with special objective lenses specifically designed for light collecting (or focusing) application of a laser light source with a single wavelength or observation application under illumination by a laser light source, it is necessary to realize a size similar to those of commercially available objective lenses while increasing the NA and the field of view as much as possible and achieving low cost. Further, in order to put to practical use, it is necessary to be achromatic within the range of spectrum of the laser light source (from several picometers to several hundred picometers) while at the same time the number of lenses should be as small as possible.

Here, as conventional objective lenses, lenses disclosed in Non-Patent Document 1 and Patent Documents 1 to 10 are known.

PRIOR ART DOCUMENT(S)

Patent Document(s)

[Patent Document 1] JPH06-242381A
[Patent Document 2] JPH11-30754A
[Patent Document 3] JP2002-182116A
[Patent Document 4] US2004/0070846A1
[Patent Document 5] US2006/0087725A1
[Patent Document 6] JP2000-155267A
[Patent Document 7] JP2004-212920A
[Patent Document 8] JP2004-118072A
[Patent Document 9] JP2010-55006A
[Patent Document 10] U.S. Pat. No. 6,952,256B2

NON-PATENT DOCUMENT(S)

[Non-Patent Document 1] J. Webb et al., "Optical Design Forms for DUV & VUV Microlithographic Processes", Optical Microlithography XIV, Proceedings of SPIE Vol. 4346 (2001)

However, none of these conventional objective lenses satisfies the above demands simultaneously. In the following, problems regarding the conventional objective lenses will be described in order.

Non-Patent Document 1 discloses specific examples of objective lenses that are suitable for various ultraviolet lasers. However, none of these is suitable for objective lenses for the applications of the present invention described above. For example, FIG. 1 of Non-Patent Document 1 shows a design example of an objective lens with an NA of 0.6 and a working wavelength of 248.4 nm, but the NA of 0.6 is small. Also, the overall length (track length) is 315 mm, which is too long for actual use.

Patent Document 1 discloses an example of an objective lens in which intervals between single lenses constituting the objective lens are changed to correspond to various laser wavelengths. The example disclosed here is a small objective lens, but as described in paragraphs [0006] and [0013] of Patent Document 1, this configuration is practical only when the field of view is narrow. Specifically, since the image height y=0.05 mm for the focal length f of 2.5 mm, the half-angle of field of view w=arctan (0.05/2.5)=1.14 degrees, which is less than or equal to a half of the half-angle of field of view of an ordinary microscope objectives. Also, as shown in the table in paragraph [0011] of Patent Document 1, the NA cannot take a large value except for a design standard state. Therefore, the objective lens of Document 1 is not suitable for the applications of the present invention described above.

Patent Document 2 discloses configuring an objective lens to be divided into the lens closest to the sample and the other lens group and moving the lens closest to the sample in the optical axis direction to observe sample or specimen surfaces at various depths while keeping the aberration unchanged. Here, according to paragraph [0014] of Patent Document 2, the focal length f of the objective lens is 8 mm and the NA is 0.8. However, in this configuration, a wide field of view cannot be realized as described later. According to the aberration diagram (FIG. 2 and FIG. 3) of an embodiment of Patent Document 2, the half-angle of field of view ω is at most 1.076 degrees. Namely, the field of view is less than or equal to a half of the field of view of an ordinary microscope objective, and therefore, the objective lens of Patent Document 2 is not suitable for the applications of the present invention described above.

Patent Document 3 and Patent Document 4 disclose examples in which aspheric surfaces or DOEs are used. However, in the applications assumed regarding the present invention, an objective lens including only spherical surfaces is optimum to configure the objective lens at the lowest cost possible. Therefore, the examples disclosed in these documents are not suitable for the applications of the present invention described above.

Patent Document 5 discloses various examples of refractive objective lenses and reflective/refractive objective lenses with the wavelength of 157 nm. These include examples with NAs of 1.3, 1.1, and 0.9 including liquid immersion configurations, but the field of view is very narrow (see paragraph [0031]) and the achromatic range also is very narrow (paragraph [0023]), and thus, the objective lenses of Patent Document 5 are not suitable for the applications of the present invention described above.

Patent Document 6, Patent Document 7, Patent Document 8, Patent Document 9, and Patent Document 10 also disclose objective lenses for ultraviolet laser light sources of various kinds, but each of these objective lenses has a size considerably larger compared to the sizes of commercially available microscope objectives. Therefore, none of these objective lenses can be installed in commercially available piezo stages. Further, these objective lenses are extremely expensive. Therefore, these objective lenses are not suitable for the applications of the present invention described above.

As discussed in the foregoing, in the laser processing devices and various inspection devices, there has been no objective lens that is low-cost and high-performance. Consequently, devices have been configured by using commercially available objective lenses that are not designed for ultraviolet laser applications. As a result, there are problems that sufficient processing accuracy cannot be achieved, high-quality images cannot be acquired, objective lenses are damaged by strong laser light sources, and so on.

SUMMARY OF THE INVENTION

In view of the foregoing background, an object of the present invention is to provide a small objective lens that is not easily damaged, is achromatic within the laser radiation waveband, has a high NA, and can achieve a wide angle of view similar to that of an ordinary microscope objective.

To achieve the above object, one aspect of the present invention provides a nine-element objective lens (1) that includes no cemented lens, has a numerical aperture greater than or equal to 0.75, and has a half-angle of field of view ω greater than or equal to 2.5 degrees, the objective lens comprising, arranged in order from a magnification side: a first lens (L1) consisting of a meniscus lens that has a convex surface facing the magnification side and has a negative refractive power; a second lens (L2) consisting of a biconcave lens; a third lens (L3) consisting of a meniscus lens that has a concave surface facing the magnification side and has a positive refractive power; a fourth lens (L4) consisting of a biconvex lens; a fifth lens (L5) consisting of a meniscus lens that has a convex surface facing the magnification side and has a negative refractive power; a sixth lens (L6) consisting of a biconvex lens; a seventh lens (L7) consisting of a lens that has an arbitrary shape and has a positive refractive power; an eighth lens (L8) consisting of a meniscus lens that has a convex surface facing the magnification side and has a positive refractive power; and a ninth lens (L9) consisting of a meniscus lens that has a convex surface facing the magnification side and has a positive refractive power, wherein the ninth lens, which is closest to a sample surface, has a thickness 1.5 times to 3 times a focal length of the objective lens.

According to this configuration, a small objective lens that is not easily damaged, is achromatic within the laser radiation waveband, has a high NA (specifically, greater than or equal to 0.75), and can achieve a wide angle of view similar to that of an ordinary microscope objective can be provided.

In the above aspect, preferably, the thickness of the ninth lens is 2.13 times to 2.15 times the focal length of the objective lens. Also, preferably, a dispersion of the fifth lens is greater than a dispersion of the sixth lens. This is because the combination of the fifth lens, which is a concave lens, and the sixth lens, which is a convex lens, can reduce the overall chromatic aberration. Also, in the above aspect, preferably, the third lens, the fourth lens, and the sixth to ninth lenses, which have positive refractive powers, are made of $CaF_2$ (calcium fluoride, fluorite), and at least one of the first lens, the second lens, and the fifth lens, which have negative refractive powers, is made of synthetic silica. This is because making the concave lens of a high dispersion material and the convex lens of a low dispersion material contributes to the overall chromatic aberration reduction.

According to the above aspect of the present invention, a small objective lens that is not easily damaged, is achromatic within the laser radiation waveband, has a high NA, and can achieve a wide angle of view similar to that of an ordinary microscope objective can be provided.

BRIEF DESCRIPTION OF THE DRAWINGS

FIG. 7 is a lateral aberration diagram of the objective lens of Example 2;

FIG. 10 is a lateral aberration diagram of the objective lens of Example 3;

FIG. 13 is a lateral aberration diagram of the objective lens of Example 4;

FIG. 16 is a lateral aberration diagram of the objective lens of Example 5.

DETAILED DESCRIPTION OF THE INVENTION

In the following, embodiments of the present invention will be described with reference to the drawings.

Figure 1:
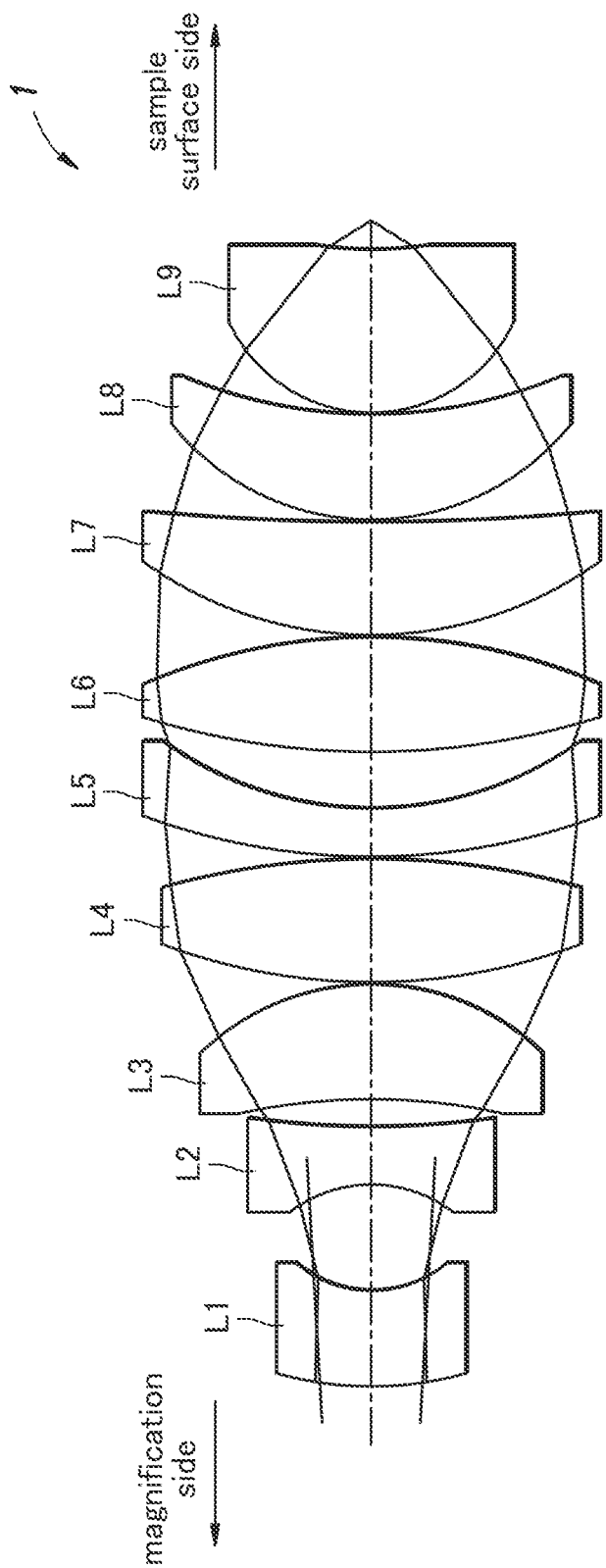
FIG. 1 is a lens layout of an objective lens according to an embodiment of the present invention.

FIG. 1 is a lens layout of an objective lens 1 according to one embodiment of the present invention. As shown in FIG. 1, the objective lens 1 is in a nine-element configuration including a first lens L1 to a ninth lens L9 arranged in this order from the magnification side. The first lens L1 consists of a meniscus lens that has a convex surface facing the magnification side and has a negative refractive power. The second lens L2 consists of a biconcave lens. The third lens L3 consists of a meniscus lens that has a concave surface facing the magnification side and has a positive refractive power. The fourth lens L4 consists of a biconvex lens. The fifth lens L5 consists of a meniscus lens that has a convex surface facing the magnification side and has a negative refractive power. The sixth lens L6 consists of a biconvex lens. The seventh lens L7 consists of a lens that has an arbitrary shape and has a positive refractive power. In the illustrated example, the seventh lens L7 consists of a meniscus lens with a convex surface facing the magnification side. The eighth lens L8 consists of a meniscus lens that has a convex surface facing the magnification side and has a positive refractive power. The ninth lens L9 consists of a meniscus lens that has a convex surface facing the magnification side and has a positive refractive power.

Due to this configuration, in the present embodiment, the object of realizing a high NA (high numerical aperture), a wide field of view, and achromatization over the laser wavelength width with a small number of lenses is achieved by an optimal lens arrangement without increasing an overall length and an outer diameter. Also, the objective lens 1 includes no cemented lens, which is made up of lenses cemented by resin, and therefore, the objective lens 1 is not easily damaged even if the laser light source is strong.

First, due to the effect of the negative lens group consisting of the meniscus lens that has a convex surface facing the magnification side and has a negative refractive power (the first lens L1) and the biconcave lens (the second lens L2) on the most magnification side, a wide field of view can be achieved.

The field of view of the objective lens 1 is determined by the field curvature of the objective lens 1 itself, and the amount thereof is determined by the Petzval sum. Since the Petzval sum is defined as a sum of the value obtained by dividing the power of each of the lenses constituting the optical system by the refractive index, the Petzval sum of the objective lens 1 inevitably becomes positive if the objective lens 1 has a positive refractive power as a whole. Therefore, to make the Petzval sum of the objective lens 1 approach zero, a lens group having a strong negative refractive power is necessary.

The two lenses constituting the first lens L1 and the second lens L2 have strong negative refractive powers and thereby reduce the overall Petzval sum. Further, the shapes of these two lenses characteristic to the present invention are close to the shape that minimizes the spherical aberration for on-axis rays, and therefore, generation of the spherical aberration is suppressed as much as possible. Namely, if the lenses are configured in shapes other than these, over-corrected spherical aberration is generated and it is not possible to keep good the overall spherical aberration. In the conventional objective lenses which do not have this configuration (for example, the lenses disclosed in Patent Document 1, Patent Document 2, and FIG. 1 of Non-Patent Document 1), the Petzval sum cannot be made small, and hence, the field curvature becomes large and a wide angle of view cannot be achieved.

Due to the effect of the two lenses that follow next, namely, the meniscus lens that has a positive refractive power and has a concave surface facing the magnification side (the third lens L3) and the biconvex lens (the fourth lens L4), the NA can be made large. These two lenses have shapes close to the shape that minimizes the spherical aberration for divergent on-axis rays. Therefore, due to these two lenses, it is possible to widen the divergent angle of on-axis rays while suppressing newly generated aberration. In the conventional objective lenses which do not have this configuration (for example, FIG. 1 of Non-Patent Document 1), the spherical aberration cannot be corrected for a large NA, and thus, it is not possible to achieve a large NA.

Further, due to the effect of the two lenses that follow next, namely, the meniscus lens that has a negative refractive power and has a convex surface facing the magnification side (the fifth lens L5) and the biconvex lens (the sixth lens L6), it is possible to correct the spherical aberration and make the NA larger. These two lenses are in the shape of a so-called separated doublet and actively correct the spherical aberration. In the conventional objective lenses which do not have this configuration (for example, FIG. 1 of Non-Patent Document 1), the spherical aberration cannot be corrected sufficiently and it is not possible to achieve a large NA.

Also, the dispersions of glass materials forming these two lenses (the fifth lens L5 and the sixth lens L6) are different, whereby the chromatic aberration is corrected even better. For example, in the wavelength region from visible down to 355 nm, ordinary optical glass can be selected, and flint glass may be selected for the concave lenses and crown glass may be selected for the convex lenses. Also, in the region of wavelength shorter than 355 nm, synthetic silica may be selected for the concave lenses and $CaF_2$ may be selected for the convex lenses.

Lastly, description will be made of the effect of the lens that has an arbitrary shape and has a positive refractive power (the seventh lens L7), the meniscus lens that has a convex surface facing the magnification side and has a positive refractive power (the eighth lens L8), and the meniscus lens that has a convex surface facing the magnification side and has a positive refractive power (the ninth lens L9). Due to these three lenses, the on-axis rays, once expanded, can be collected with a high NA without generating aberration considerably.

Here, the effect of "the thickness of the ninth lens L9 which is closest to the sample surface being 1.5 times to 3 times the lens' overall focal length," which is another characteristic feature of the present invention, will be supplementarily described. The thick lens disposed on the sample surface side, namely, on the reduction side or the light collecting side, is useful in not only correction of the spherical aberration but also correction of the chromatic aberration.

Figure 2:
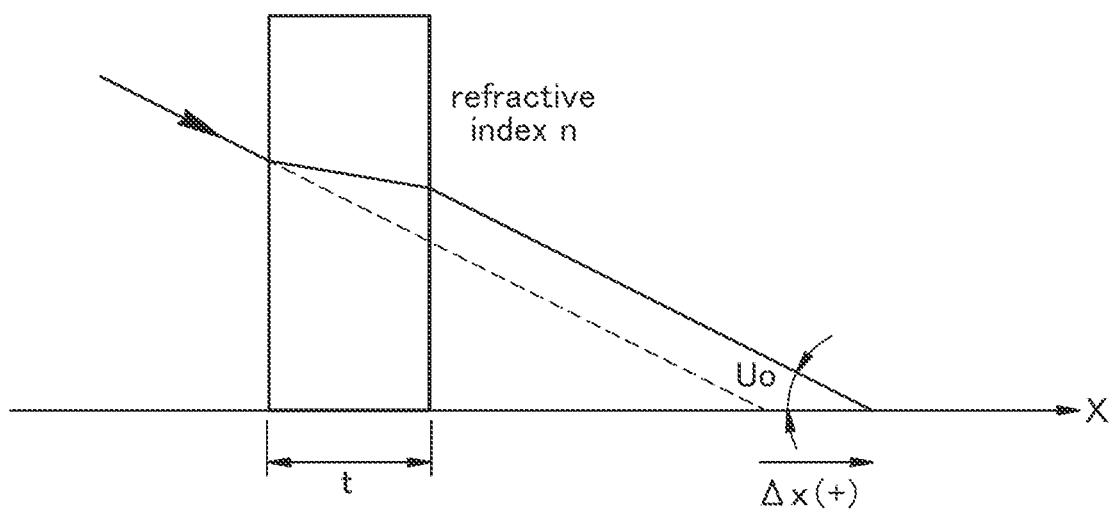
FIG. 2 is an explanatory diagram for explaining aberration due to refraction caused by a thick parallel surface plate.

By modeling the thick lens with a parallel surface plate, a configuration shown in FIG. 2 in which a parallel surface plate having a thickness t and a refractive index n is inserted in a path of converging rays with a light conversion angle $U_0$ will be discussed below theoretically.

According to the law of refraction and the plane geometry, an image point movement $\Delta x$ due to the parallel surface plate is expressed by the following formula (1).

$$\Delta x = t\left\{1 - \frac{\sqrt{1 - \sin^2 U_0}}{\sin U_0} \frac{\sin U_0/n}{\sqrt{1 - (\sin U_0/n)^2}}\right\} \quad (1)$$

By expanding this into a Taylor series based on $NA = \sin U_0$ and ignoring the third and subsequent terms, the following approximation is obtained.

$$\Delta x \cong t\left(1 - \frac{1}{n}\right) + \frac{t}{2n}\left(1 - \frac{1}{n^2}\right)\sin^2 U_0 \quad (2)$$

The first term of the formula (2) indicates the image point movement due to the parallel surface plate. Since the first term includes the refractive index n in the denominator, it means the on-axis chromatic aberration considering the variation of the refractive index for each wavelength. Considering two refractive indices $n_1$ and $n_2$ ($n_1 > n_2$) within the used wavelengths and the difference $\Delta x_c$ therebetween, the following formula (3) is obtained.

$$\Delta x_C = t\left(1 - \frac{1}{n_1}\right) - t\left(1 - \frac{1}{n_2}\right) = t\left(\frac{1}{n_2} - \frac{1}{n_1}\right) \sim t\frac{n_1 - n_2}{n^2} \quad (3)$$

Since $\Delta x_c$ is positive for the two refractive indices $n_1$ and $n_2$, this indicates over-corrected on-axis chromatic aberration. Since ordinary lenses are under-corrected, this means that the over-corrected on-axis chromatic aberration due to the thick parallel surface plate cancels out the under-corrected chromatic aberration of ordinary lenses so that the on-axis chromatic aberration can be made small as a whole.

The second term of the formula (2) represents a positive value that increases as the NA increases. In other words, the second term indicates an amount of over-corrected spherical aberration. Since ordinary lenses are under-corrected, the over-corrected spherical aberration due to the thick parallel surface plate cancels out the under-corrected spherical aberration of ordinary lenses so that the spherical aberration can be made small as a whole. In addition, the thick meniscus lens has an effect of reducing the Petzval sum.

These effects are better demonstrated by a thicker parallel surface plate corresponding to the meniscus lens, but if the parallel surface plate is too thick, it may undesirably shorten the working distance of the objective lens 1, which is practically disadvantageous. Therefore, there is an optimal range of the thickness of the parallel surface plate. Here, the thickness of the ninth lens preferably is within the range of 1.5 times to 3 times the lens' overall focal length. This is because if the thickness of the ninth lens becomes smaller than the lower limit or 1.5 times the focal length, correction of the spherical aberration and the chromatic aberration becomes insufficient. Also, if the thickness of the ninth lens exceeds the upper limit or 3 times the focal length, the spherical aberration is over-corrected and at the same time this is disadvantageous in view of the working distance. Further, as a result of study, it was found that more preferably, the thickness of the ninth lens L9 which is closest to the sample surface is about 2.14 times (2.13 times to 2.15 times, preferably 2.135 times to 2.14 times) the lens' overall focal length.

Based on the foregoing, to achieve a small-size and high-performance objective lens that is constituted of a small number of lenses and includes only spherical surfaces, the configuration shown in FIG. 1 is effective. To demonstrate this, conventional lenses that do not meet the requirements of the embodiment of the present invention will be discussed in the following.

For example, in the arrangement shown in FIG. 1 of Non-Patent Document 1, "the meniscus lens that has a negative refractive power and has a convex surface facing the magnification side and the biconcave lens" corresponding to the first lens L1 and the second lens L2 located on the most magnification side are not included. Also, "the meniscus lens that has a negative refractive power and has a convex surface facing the magnification side and the biconvex lens" corresponding to the fifth lens L5 and the sixth lens L6 are not included. As a result, in the arrangement of this prior art document, the NA is 0.65, which is small, and the overall length is very long.

In the arrangement disclosed in Patent Document 2, "the meniscus lens that has a negative refractive power and has a convex surface facing the magnification side and the biconcave lens" corresponding to the first lens L1 and the second lens L2 that are located on the most magnification side are not included, and therefore, the field curvature is not corrected, and hence the angle of view is narrow.

As mentioned above, Patent Document 3 and Patent Document 4 disclose objective lenses using aspheric surfaces or DOEs and having configurations different from the configuration of the present invention. However, the configurations of these conventional objective lenses are against the object of the present invention of providing the objective lens 1 at the lowest cost possible.

As also mentioned above, Patent Document 5 discloses examples of refractive objective lenses and reflective/refractive objective lenses with the wavelength of 157 nm. These conventional objective lenses have configurations different from the configuration of the present invention, and as a result, the field of view is very narrow (see paragraph [0031]) and the achromatic range also is very narrow (paragraph [0023]), and thus, these conventional objective lenses are not suitable for the applications of the present invention described above.

In the arrangement disclosed in Patent Document 6, the shapes of "the meniscus lens that has a negative refractive power and has a convex surface facing the magnification side and the biconcave lens" corresponding to the first lens L1 and the second lens L2 that are located on the most magnification side are different. Also, a meniscus lens that has a convex surface facing the magnification side and has a negative refractive power (the fifth lens L5) and a biconvex lens (the sixth lens L6) are not included. Further, the thickness of the convex meniscus lens on the most reduction side is about one time the focal length and thus is thin. As a result, to correct the spherical aberration, a larger number of lenses are necessary compared to the configuration disclosed herein, and thus, the overall length cannot be made sufficiently short. Also, the chromatic aberration is not corrected.

In Patent Document 7 also, similarly to Patent Document 6, the thickness of the lens on the most reduction side is approximately the same as the focal length, and therefore, the thickness of the lens is not used to actively correct the chromatic aberration correction. Rather, correction of the spherical aberration and the chromatic aberration is achieved by combining many concave lenses and convex lenses. In such a configuration, the combination of concave lenses and convex lenses deteriorates the Petzval sum, whereby correction of the field curvature is difficult and a wide field of view cannot be achieved. This is also the case with the objective lenses disclosed in Patent Document 8 and Patent Document 9, and these conventional objective lenses require many lenses and a large lens length to achieve both a wide field of view and a high NA.

In Patent Document 10, the combination of the meniscus lens that has a convex surface facing the magnification side and has a negative refractive power (L5) and the biconvex lens (L6) and the thick meniscus lens located on the most reduction side are not included. Therefore, not only correction of the Petzval sum is difficult as well as spherical aberration, and either of them needs to be compromised. As a result, a long focal length and a long overall length are necessary to secure a wide field of view.

In the objective lens 1 according to the present invention, the Petzval sum, the spherical aberration, and the chromatic aberration are effectively corrected by an optimal lens arrangement, whereby a high NA, a wide field of view, and achromatization over the laser wavelength width can be realized with a small number of lenses. Accordingly, the objective lens 1 of the present invention has an advantage that, when combined with an inexpensive stage optimal for an inspection device or a laser processing device, can configure a system having high imaging performance.

Example 1

Table 1 shows the lens data of an objective lens 1 of Example 1. In the objective lens 1 of Example 1, the focal length f is 4 mm, the wavelength is 193.4±0.004 nm, the NA is 0.85, and the field-of-view diameter D is 0.45 mm. The half-angle of field of view ω is arctan (0.45/2/4)=3.21 degrees. The thickness of the ninth lens L9 which is closest to the sample surface is 8.544 mm, and (the thickness of the lens closest to the sample surface)/(the focal length of the whole lens system) is 2.136. The fifth lens L5 is made of synthetic silica, while the sixth lens L6 is made of $CaF_2$. Therefore, the fifth lens L5 is made of a material having a dispersion greater than that of the material of the sixth lens L6. Also, the all lenses having positive refractive powers (the third lens L3, the fourth lens L4, and the sixth to ninth lenses L6-L9) are made of $CaF_2$. At least one of the lenses having negative refractive powers (the first lens L1, the second lens L2, and the fifth lens L5) is made of synthetic silica.

TABLE 1

| Surface number | Radius of curvature | Thickness | Glass | n(193.396) | n(193.4) | n(193.404) |
|---|---|---|---|---|---|---|
| Object plane | ∞ | ∞ | | | | |
| 1 | 18.699 | 5.000 | synthetic silica | 1.5602046 | 1.5601985 | 1.5601924 |
| 2 | 6.197 | 5.569 | | | | |
| 3 | −7.174 | 3.000 | synthetic silica | 1.5602046 | 1.5601985 | 1.5601924 |
| 4 | 45.150 | 1.482 | | | | |
| 5 | −32.173 | 6.000 | $CaF_2$ | 1.5013295 | 1.5013257 | 1.5013219 |
| 6 | −13.012 | 0.100 | | | | |
| 7 | 31.647 | 6.455 | $CaF_2$ | 1.5013295 | 1.5013257 | 1.5013219 |
| 8 | −40.799 | 0.100 | | | | |
| 9 | 34.400 | 2.500 | synthetic silica | 1.5602046 | 1.5601985 | 1.5601924 |
| 10 | 18.700 | 3.000 | | | | |
| 11 | 40.510 | 6.000 | $CaF_2$ | 1.5013295 | 1.5013257 | 1.5013219 |
| 12 | −30.432 | 0.100 | | | | |
| 13 | 20.506 | 5.942 | $CaF_2$ | 1.5013295 | 1.5013257 | 1.5013219 |
| 14 | 142.536 | 0.100 | | | | |
| 15 | 13.504 | 5.500 | $CaF_2$ | 1.5013295 | 1.5013257 | 1.5013219 |
| 16 | 25.874 | 0.100 | | | | |
| 17 | 8.291 | 8.545 | $CaF_2$ | 1.5013295 | 1.5013257 | 1.5013219 |
| 18 | 19.473 | 1.532 | | | | |
| Image plane | ∞ | 0.000 | | | | |

Figure 3:
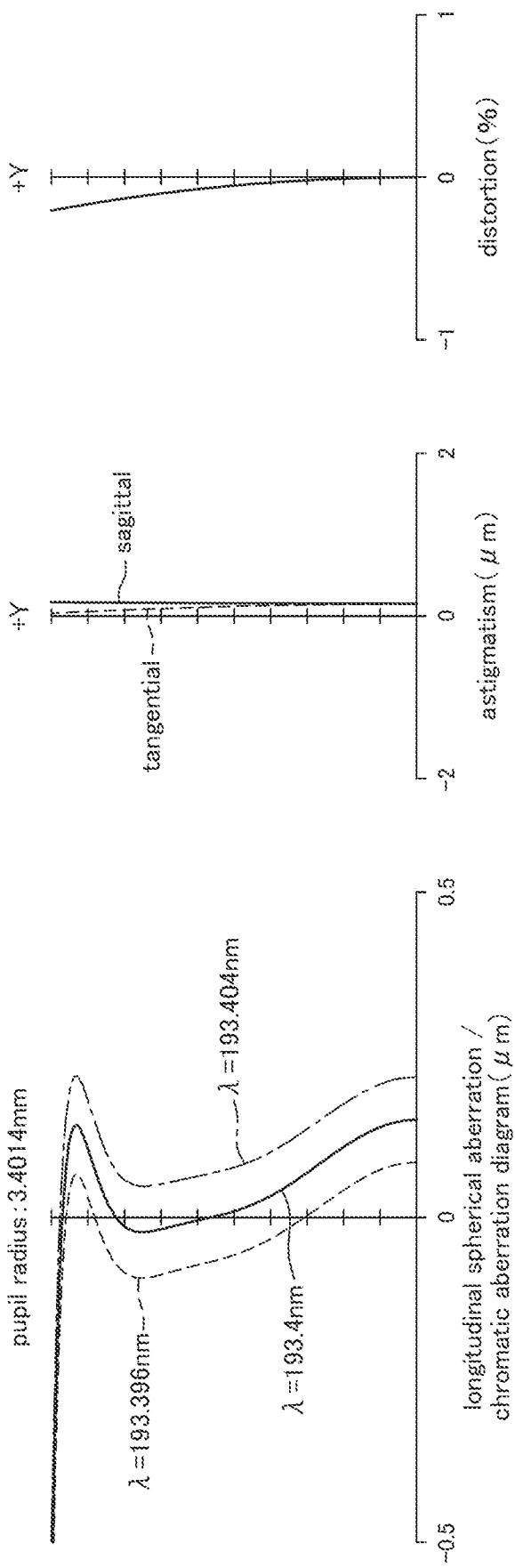
FIG. 3 is a longitudinal aberration diagram of an objective lens of Example 1.
Figure 4:
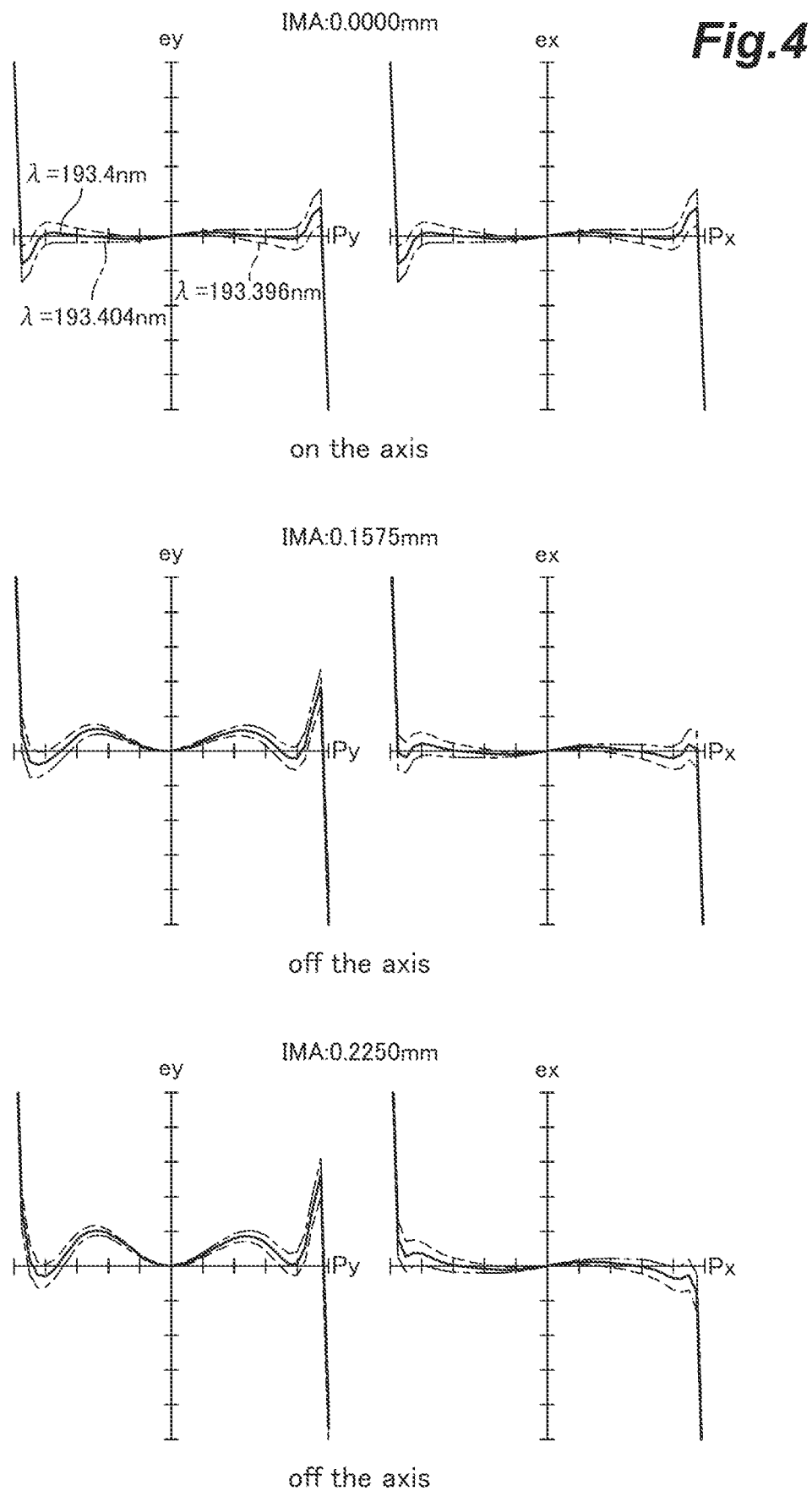
FIG. 4 is a lateral aberration diagram of the objective lens of Example 1.

The longitudinal aberration diagram of the objective lens 1 of Example 1 is shown in FIG. 3, and the lateral aberration diagram of the objective lens 1 of Example 1 is shown in FIG. 4.

Figure 6:
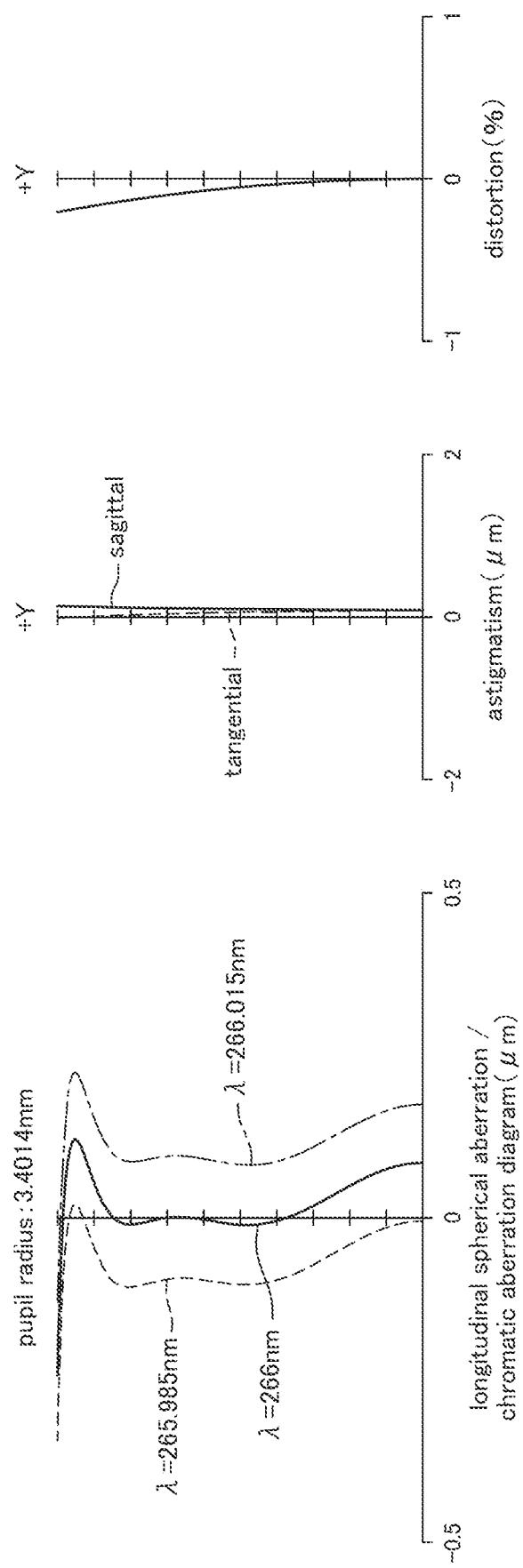
FIG. 6 is a longitudinal aberration diagram of the objective lens of Example 2.

The longitudinal aberration diagram of the objective lens 1 of Example 2 is shown in FIG. 6, and the lateral aberration diagram of the objective lens 1 of Example 2 is shown in FIG. 7.

Example 2

Figure 5:
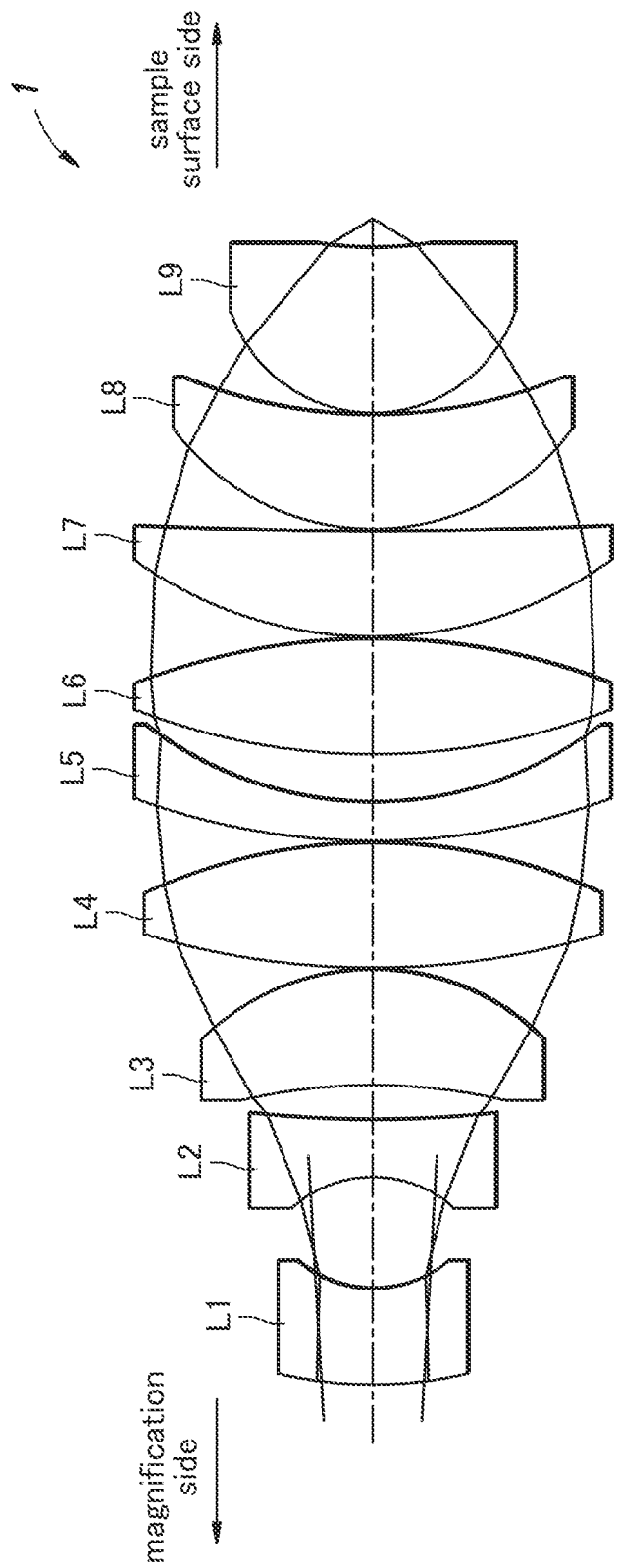
FIG. 5 is a lens layout of an objective lens of Example 2.

FIG. 5 is a lens layout of an objective lens 1 of Example 2. Table 2 shows the lens data of the objective lens 1 of Example 2. In the objective lens 1 of Example 2, the focal length f is 4 mm, the wavelength is 266±0.015 nm, the NA is 0.85, and the field of view φ is 0.45 mm. The half-angle of field of view ω is arctan (0.45/2/4)=3.21 degrees. The thickness of the ninth lens L9 which is closest to the sample surface is 8.56 mm, and (the thickness of the lens closest to the sample surface)/(the focal length of the whole lens system) is 2.14. The fifth lens L5 is made of synthetic silica, while the sixth lens L6 is made of $CaF_2$. Therefore, the fifth lens L5 is made of a material having a dispersion greater than that of the material of the sixth lens L6. Also, the all lenses having positive refractive powers (the third lens L3, the fourth lens L4, and the sixth to ninth lenses L6-L9) are made of $CaF_2$. At least one of the lenses having negative refractive powers (the first lens L1, the second lens L2, and the fifth lens L5) is made of synthetic silica.

Example 3

Figure 8:
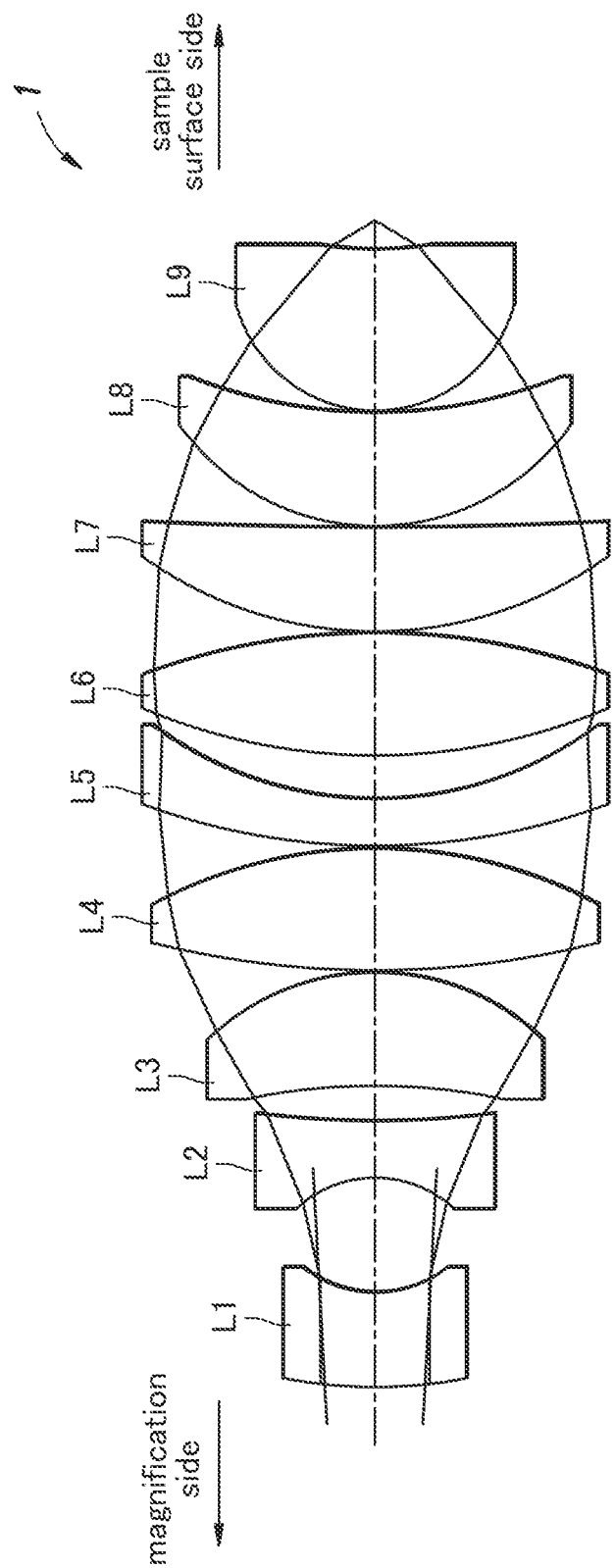
FIG. 8 is a lens layout of an objective lens of Example 3.

FIG. 8 is a lens layout of an objective lens 1 of Example 3. Table 3 shows the lens data of the objective lens 1 of Example 3. In the objective lens 1 of Example 3, the focal length f is 4 mm, the wavelength is 355±0.05 nm, the NA is 0.85, and the field of view φ is 0.45 mm. The half-angle of field of view ω is arctan (0.45/2/4)=3.21 degrees. The thickness of the ninth lens L9 which is closest to the sample surface is 8.54 mm, and (the thickness of the lens closest to the sample surface)/(the focal length of the whole lens system) is 2.135. The fifth lens L5 is made of synthetic silica, while the sixth lens L6 is made of $CaF_2$. Therefore, the fifth lens L5 is made of a material having a dispersion greater than that of the material of the sixth lens L6. Also, the all lenses having positive refractive powers (the third lens L3, the fourth lens L4, and the sixth to ninth lenses L6-L9) are made of $CaF_2$. At least one of the lenses having negative refractive powers (the first lens L1, the second lens L2, and the fifth lens L5) is made of synthetic silica.

TABLE 2

| Surface number | Radius of curvature | Thickness | Glass | n(265.985) | n(266) | n(266.015) |
|---|---|---|---|---|---|---|
| Object plane | ∞ | ∞ | | | | |
| 1 | 23.231 | 5.000 | synthetic silica | 1.4997988 | 1.4997923 | 1.4997858 |
| 2 | 6.245 | 5.757 | | | | |
| 3 | −6.599 | 3.000 | synthetic silica | 1.4997988 | 1.4997923 | 1.4997858 |
| 4 | 59.236 | 1.811 | | | | |
| 5 | −30.585 | 6.000 | $CaF_2$ | 1.4620646 | 1.4620602 | 1.4620559 |
| 6 | −12.994 | 0.100 | | | | |
| 7 | 42.032 | 6.500 | $CaF_2$ | 1.4620646 | 1.4620602 | 1.4620559 |
| 8 | −28.660 | 0.100 | | | | |
| 9 | 36.344 | 2.000 | synthetic silica | 1.4997988 | 1.4997923 | 1.4997858 |
| 10 | 19.770 | 2.500 | | | | |
| 11 | 34.524 | 6.000 | $CaF_2$ | 1.4620646 | 1.4620602 | 1.4620559 |
| 12 | −35.061 | 0.100 | | | | |
| 13 | 21.540 | 5.500 | $CaF_2$ | 1.4620646 | 1.4620602 | 1.4620559 |
| 14 | 272.174 | 0.100 | | | | |
| 15 | 13.085 | 5.979 | $CaF_2$ | 1.4620646 | 1.4620602 | 1.4620559 |
| 16 | 26.670 | 0.100 | | | | |
| 17 | 7.965 | 8.562 | $CaF_2$ | 1.4620646 | 1.4620602 | 1.4620559 |
| 18 | 17.280 | 1.562 | | | | |
| Image plane | ∞ | 0.000 | | | | |

TABLE 3

| Surface number | Radius of curvature | Thickness | Glass | n(354.95) | n(355) | n(355.05) |
|---|---|---|---|---|---|---|
| Object plane | ∞ | ∞ | | | | |
| 1 | 30.630 | 5.000 | synthetic silica | 1.4761799 | 1.4761720 | 1.4761641 |
| 2 | 6.704 | 6.095 | | | | |
| 3 | −6.429 | 3.000 | synthetic silica | 1.4761799 | 1.4761720 | 1.4761641 |
| 4 | 46.373 | 1.895 | | | | |
| 5 | −34.252 | 6.000 | CaF$_2$ | 1.4459401 | 1.4459347 | 1.4459292 |
| 6 | −13.141 | 0.100 | | | | |
| 7 | 49.582 | 6.500 | CaF$_2$ | 1.4459401 | 1.4459347 | 1.4459292 |
| 8 | −25.210 | 0.100 | | | | |
| 9 | 36.198 | 2.500 | synthetic silica | 1.4761799 | 1.4761720 | 1.4761641 |
| 10 | 20.242 | 2.282 | | | | |
| 11 | 32.020 | 6.500 | CaF$_2$ | 1.4459401 | 1.4459347 | 1.4459292 |
| 12 | −36.764 | 0.100 | | | | |
| 13 | 21.359 | 5.500 | CaF$_2$ | 1.4459401 | 1.4459347 | 1.4459292 |
| 14 | 240.517 | 0.100 | | | | |
| 15 | 12.998 | 6.000 | CaF$_2$ | 1.4459401 | 1.4459347 | 1.4459292 |
| 16 | 27.265 | 0.100 | | | | |
| 17 | 7.809 | 8.547 | CaF$_2$ | 1.4459401 | 1.4459347 | 1.4459292 |
| 18 | 15.641 | 1.590 | | | | |
| Image plane | ∞ | 0.000 | | | | |

Figure 9:
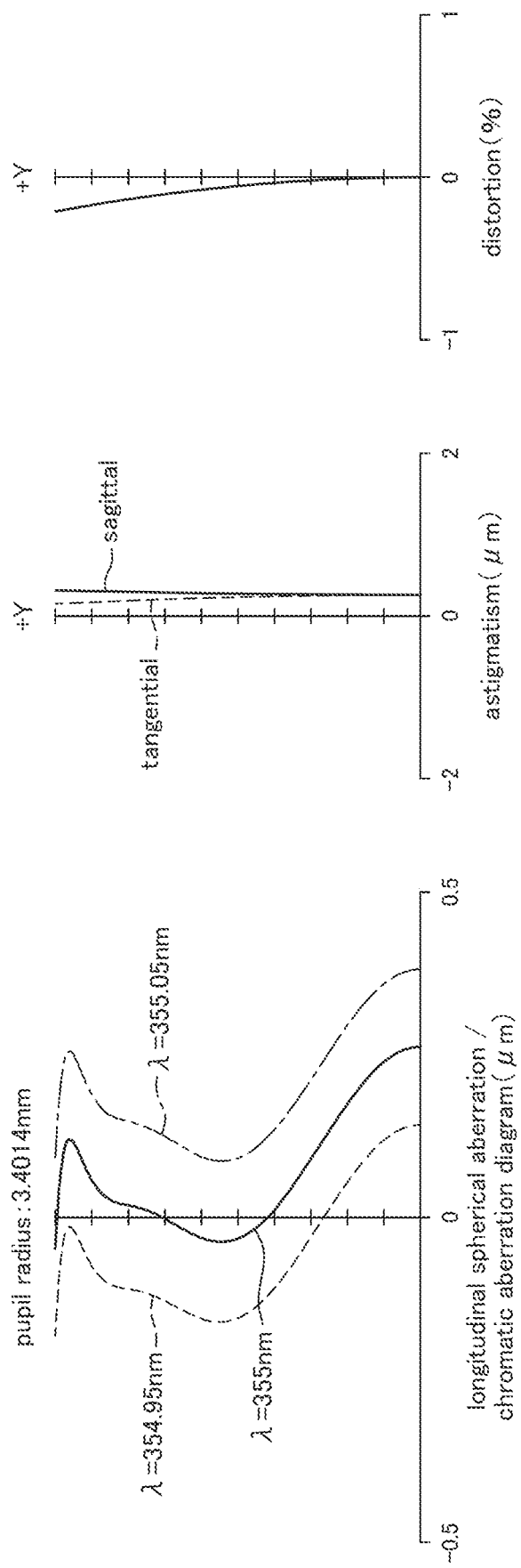
FIG. 9 is a longitudinal aberration diagram of the objective lens of Example 3.

The longitudinal aberration diagram of the objective lens 1 of Example 3 is shown in FIG. 9, and the lateral aberration diagram of the objective lens 1 of Example 3 is shown in FIG. 10.

Example 4

Figure 11:
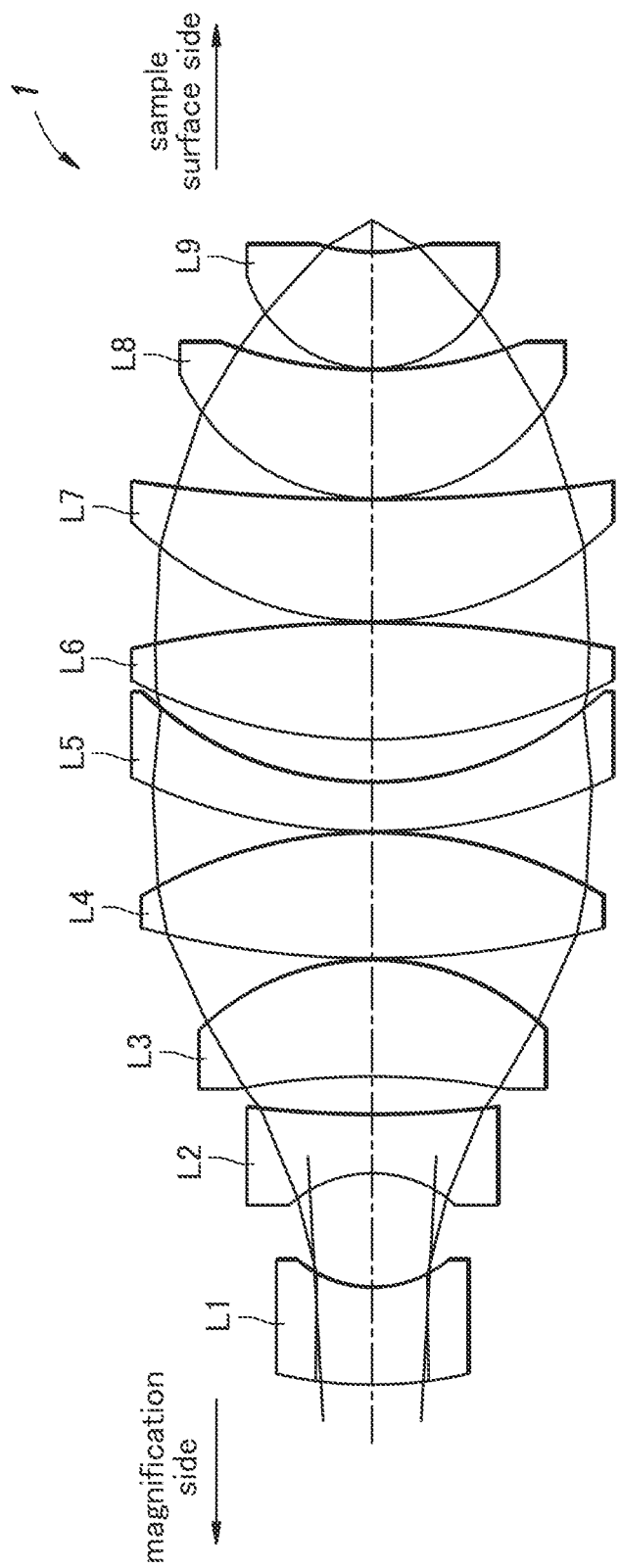
FIG. 11 is a lens layout of an objective lens of Example 4.

FIG. 11 shows a lens layout of an objective lens 1 of Example 4. Table 4 shows the lens data of the objective lens 1 of Example 4. In the objective lens 1 of Example 4, the focal length f is 4 mm, the wavelength is 266±0.015 nm, the NA is 0.85, and the field of view φ is 0.45 mm. The half-angle of field of view ω is arctan (0.45/2/4)=3.21 degrees. The thickness of the ninth lens L9 which is closest to the sample surface is 6 mm, and (the thickness of the lens closest to the sample surface)/(the focal length of the whole lens system) is 1.5. This value is a lower limit value of the preferred range of the thickness of the ninth lens L9, and if the thickness of the ninth lens L9 is less than this value, correction of the spherical aberration and the chromatic aberration becomes insufficient, whereby the objective lens 1 cannot demonstrate desired performance. The fifth lens L5 is made of synthetic silica, while the sixth lens L6 is made of CaF$_2$. Therefore, the fifth lens L5 is made of a material having a dispersion greater than that of the material of the sixth lens L6. Also, the all lenses having positive refractive powers (the third lens L3, the fourth lens L4, and the sixth to ninth lenses L6-L9) are made of CaF$_2$. At least one of the lenses having negative refractive powers (the first lens L1, the second lens L2 and the fifth lens L5) is made of synthetic silica.

TABLE 4

| Surface number | Radius of curvature | Thickness | Glass | n(265.985) | n(266) | n(266.015) |
|---|---|---|---|---|---|---|
| Object plane | ∞ | ∞ | | | | |
| 1 | 22.540 | 5 | synthetic silica | 1.4997988 | 1.4997923 | 1.4997858 |
| 2 | 6.164 | 5.961 | | | | |
| 3 | −6.429 | 3 | synthetic silica | 1.4997988 | 1.4997923 | 1.4997858 |
| 4 | 55.249 | 2.004 | | | | |
| 5 | −37.790 | 6 | CaF$_2$ | 1.4620646 | 1.4620602 | 1.4620559 |
| 6 | −13.048 | 0.1 | | | | |
| 7 | 46.614 | 6.5 | CaF$_2$ | 1.4620646 | 1.4620602 | 1.4620559 |
| 8 | −23.615 | 0.1 | | | | |
| 9 | 29.516 | 2.5 | synthetic silica | 1.4997988 | 1.4997923 | 1.4997858 |
| 10 | 17.744 | 2.256 | | | | |
| 11 | 27.323 | 6 | CaF$_2$ | 1.4620646 | 1.4620602 | 1.4620559 |
| 12 | −59.468 | 0.1 | | | | |
| 13 | 17.801 | 6.282 | CaF$_2$ | 1.4620646 | 1.4620602 | 1.4620559 |
| 14 | 82.342 | 0.1 | | | | |
| 15 | 11.008 | 6.594 | CaF$_2$ | 1.4620646 | 1.4620602 | 1.4620559 |
| 16 | 22.424 | 0.1 | | | | |

TABLE 4-continued

| Surface number | Radius of curvature | Thickness | Glass | n(265.985) | n(266) | n(266.015) |
|---|---|---|---|---|---|---|
| 17 | 6.823 | 6 | CaF$_2$ | 1.4620646 | 1.4620602 | 1.4620559 |
| 18 | 10.411 | 1.742 | | | | |
| Image plane | ∞ | 0 | | | | |

Figure 12:
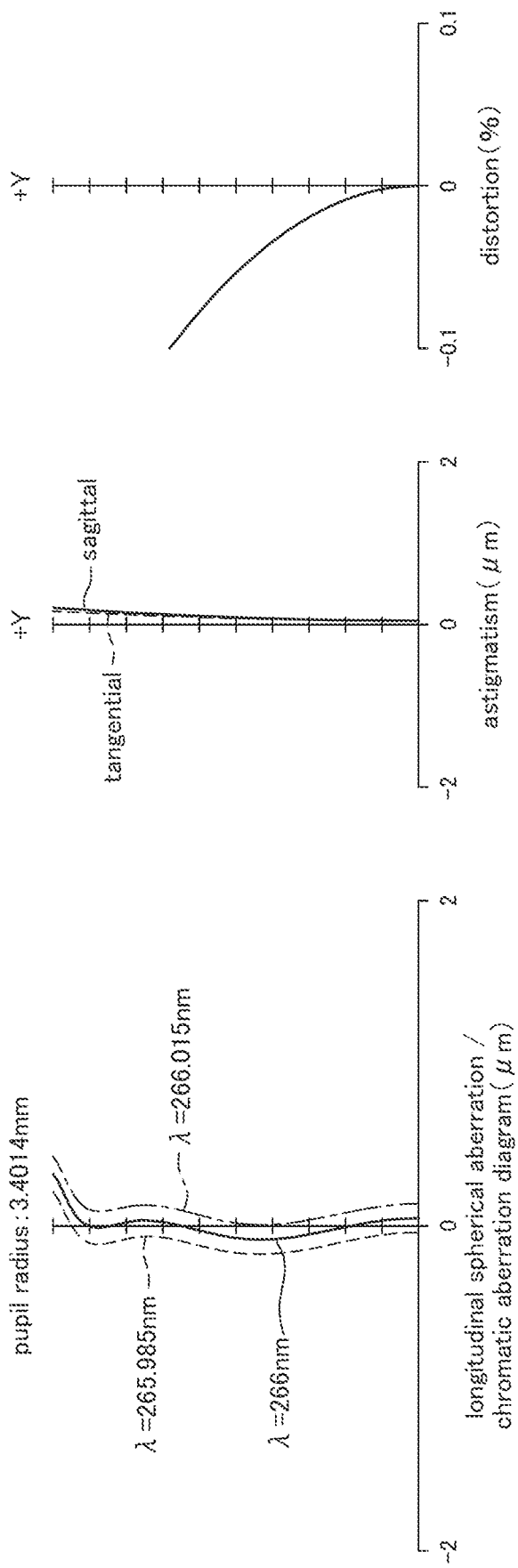
FIG. 12 is a longitudinal aberration diagram of the objective lens of Example 4.

The longitudinal aberration diagram of the objective lens 1 of Example 4 is shown in FIG. 12, and the lateral aberration diagram of the objective lens 1 of Example 4 is shown in FIG. 13.

Example 5

Figure 14:
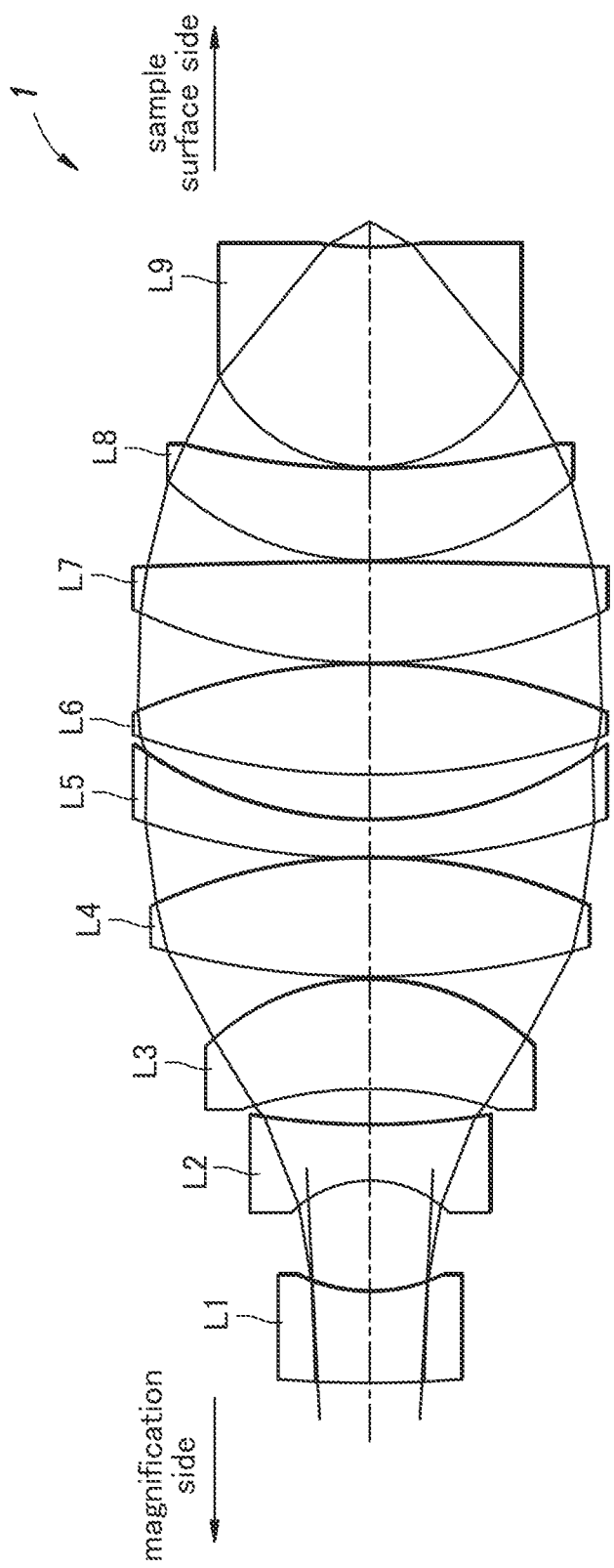
FIG. 14 is a lens layout of an objective lens of Example 5.

FIG. 14 shows a lens layout of the objective lens 1 of Example 5. Table 5 shows the lens data of the objective lens 1 of Example 5. In the objective lens 1 of Example 5, the focal length f is 4 mm, the wavelength is 260±0.015 nm, the NA is 0.85, and the field of view φ is 0.45 mm. The half-angle of field of view ω is arctan (0.45/2/4)=3.21 degrees. The thickness of the ninth lens L9 which is closest to the sample surface is 12 mm, and (the thickness of the lens closest to the sample surface)/(the focal length of the whole lens system) is 3. This value is an upper limit value of the preferred range of the thickness of the ninth lens L9, and if the thickness of the ninth lens L9 exceeds this value, the spherical aberration is over-corrected and at the same time this is disadvantageous in view of the working distance, whereby the objective lens 1 cannot demonstrate desired performance. The fifth lens L5 is made of synthetic silica, while the sixth lens L6 is made of CaF$_2$. Therefore, the fifth lens L5 is made of a material having a dispersion greater than that of the material of the sixth lens L6. Also, the all lenses having positive refractive powers (the third lens L3, the fourth lens L4, and the sixth to ninth lenses L6-L9) are made of CaF$_2$. At least one of the lenses having negative refractive powers (the first lens L1, the second lens L2, and the fifth lens L5) is made of synthetic silica.

TABLE 5

| Surface number | Radius of curvature | Thickness | Glass | n(265.985) | n(266) | n(266.015) |
|---|---|---|---|---|---|---|
| Object plane | ∞ | ∞ | | | | |
| 1 | 62.963 | 5 | synthetic silica | 1.4997988 | 1.4997923 | 1.4997858 |
| 2 | 9.131 | 6.089 | | | | |
| 3 | −6.093 | 3 | synthetic silica | 1.4997988 | 1.4997923 | 1.4997858 |
| 4 | 36.811 | 2 | | | | |
| 5 | −22.556 | 6 | CaF$_2$ | 1.4620646 | 1.4620602 | 1.4620559 |
| 6 | −12.932 | 0.1 | | | | |
| 7 | 44.316 | 6.5 | CaF$_2$ | 1.4620646 | 1.4620602 | 1.4620559 |
| 8 | −29.094 | 0.1 | | | | |
| 9 | 41.369 | 2 | synthetic silica | 1.4997988 | 1.4997923 | 1.4997858 |
| 10 | 22.537 | 2.5 | | | | |
| 11 | 39.993 | 6 | CaF$_2$ | 1.4620646 | 1.4620602 | 1.4620559 |
| 12 | −33.190 | 0.1 | | | | |
| 13 | 30.289 | 5.5 | CaF$_2$ | 1.4620646 | 1.4620602 | 1.4620559 |
| 14 | −302.776 | 0.1 | | | | |
| 15 | 16.353 | 5 | CaF$_2$ | 1.4620646 | 1.4620602 | 1.4620559 |
| 16 | 39.943 | 0.1 | | | | |
| 17 | 9.382 | 12 | CaF$_2$ | 1.4620646 | 1.4620602 | 1.4620559 |
| 18 | 20.415 | 1.522 | | | | |
| Image plane | ∞ | 0 | | | | |

Figure 15:
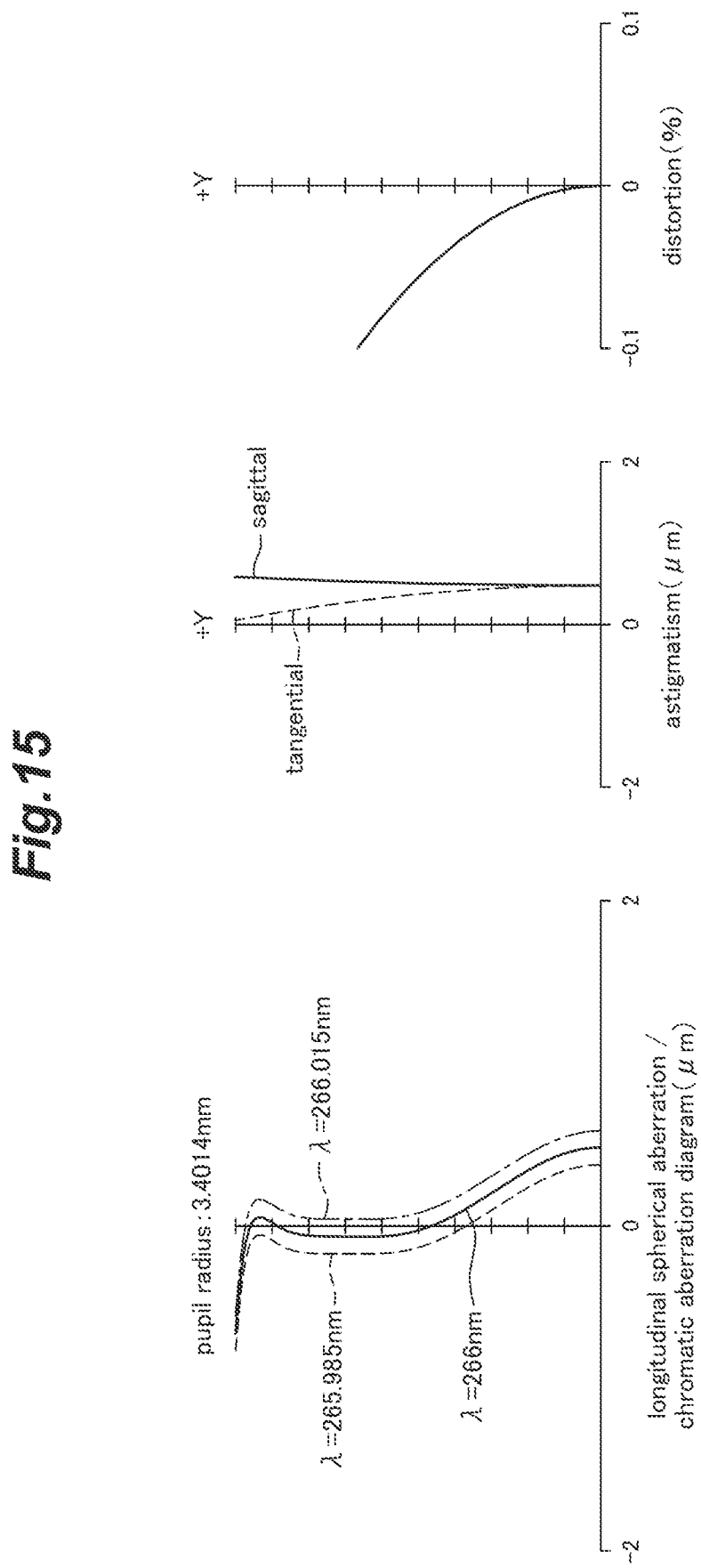
FIG. 15 is a longitudinal aberration diagram of the objective lens of Example 5.

The longitudinal aberration diagram of the objective lens 1 of Example 5 is shown in FIG. 15, and the lateral aberration diagram of the objective lens 1 of Example 5 is shown in FIG. 16.

Concrete embodiments of the present invention have been described in the foregoing, but the present invention is not limited to the above embodiments and examples may be modified or altered in various ways.

The invention claimed is:

1. A nine-element objective lens that includes no cemented lens, has a numerical aperture greater than or equal to 0.75, and has a half-angle of field of view ω greater than or equal to 2.5 degrees, the objective lens comprising, arranged in order from a magnification side:
a first lens consisting of a meniscus lens that has a convex surface facing the magnification side and has a negative refractive power;
a second lens consisting of a biconcave lens;
a third lens consisting of a meniscus lens that has a concave surface facing the magnification side and has a positive refractive power;
a fourth lens consisting of a biconvex lens;
a fifth lens consisting of a meniscus lens that has a convex surface facing the magnification side and has a negative refractive power;
a sixth lens consisting of a biconvex lens;
a seventh lens consisting of a lens that has an arbitrary shape and has a positive refractive power;
an eighth lens consisting of a meniscus lens that has a convex surface facing the magnification side and has a positive refractive power; and
a ninth lens consisting of a meniscus lens that has a convex surface facing the magnification side and has a positive refractive power,
wherein the ninth lens, which is closest to a sample surface, has a thickness 1.5 times to 3 times a focal length of the objective lens.

2. The objective lens according to claim 1, wherein the thickness of the ninth lens is 2.13 times to 2.15 times the focal length of the objective lens.

3. The objective lens according to claim 1, wherein a dispersion of the fifth lens is greater than a dispersion of the sixth lens.

4. The objective lens according to claim 1, wherein the third lens, the fourth lens, and the sixth to ninth lenses, which have positive refractive powers, are made of $CaF_2$, and at least one of the first lens, the second lens, and the fifth lens, which have negative refractive powers, is made of synthetic silica.

* * * * *